United States Patent [19]
Brecher

[11] 3,807,935
[45] Apr. 30, 1974

[54] FLASH LAMP

[75] Inventor: Charles Brecher, Little Neck, N.Y.

[73] Assignee: GTE Laboratories Incorporated, Waltham, Mass.

[22] Filed: Oct. 14, 1971

[21] Appl. No.: 189,381

[52] U.S. Cl. ................................................ 431/93
[51] Int. Cl. ............................................. F21k 5/02
[58] Field of Search ................................ 431/93–95

[56] References Cited
UNITED STATES PATENTS
3,415,605  12/1968  Van Der Tas ........................ 431/93
3,377,126  4/1968  Nijland et al. ........................ 431/94
3,301,021  1/1967  Nijland et al. ........................ 431/95
2,554,094  5/1951  De Vriend et al. ................... 431/95

Primary Examiner—Carroll B. Dority, Jr.
Attorney, Agent, or Firm—Irving M. Kriegsman

[57] ABSTRACT

A flash lamp comprising a sealed transparent bulb containing a solid substance, an oxidant gas and an ignition mechanism, the oxidant gas including relatively minor amounts of a gaseous additive which decreases the time from ignition of the solid substance until the luminous flux created by such ignition increases to its maximum value. The gaseous additive is a totally halogenated inorganic or organic compound having at least one chlorine atom in its molecular structure.

25 Claims, 2 Drawing Figures

FLASH LAMP

BACKGROUND OF THE INVENTION

This invention relates to a combustion flash bulb lamp of the type producing useful electromagnetic radiation by the reaction of a solid substance with an oxidant gas.

Conventional lamps of this type generally comprise a sealed transparent bulb, made usually of glass, which contains a shredded metallic material in an oxidant atmosphere. The lamp also contains, or has associated therewith, an ignition mechanism for inducing a light-generating reaction between the solid substance and the gaseous oxidant atmosphere. In a conventional structure, a paste of a mixture of zirconium powder, lead dioxide and nitrocellulose is provided on a tungsten wire which can be caused to glow electrically. When an electric current of sufficient strength is passed through the tungsten wire, the paste explodes and causes the shredded metallic material to burn. At the elevated temperatures caused by the burning of the shredded metal, the metal reacts with the oxidant atmosphere to generate light which can be directed at a subject for photographic purposes.

When employed in such photographic applications, the light-time characteristics of the flash lamp must match the exposure characteristics of the camera shutters and the spectral distribution of the light emanating from the lamp must be adapted to the spectral sensitivity of the photographic film. Thus, the spectral distribution of the luminous energy should be close to that of daylight, the emitted quantity of light should be as large as possible, and the relationship between luminous flux and time should correspond to the properties of the camera shutter.

With regard to the latter factor, many flash systems have a "time-to-full-peak" (i.e., the time for the luminous flux to increase to its maximum value) which is too long when compared to the time during which the camera shutter is open. At least for those applications, such a flash system therefore becomes unsatisfactory. In Nijland, et al., U.S. Pat. No. 3,301,021 there is described a flash lamp having a gas filling consisting of fluorine or one or more volatile fluorine compounds which dissociate at elevated temperatures. A major disadvantage of such flash lamps, wherein fluorine or a volatile fluorine compound is utilized to react with the shredded metal, is that the "time-to-full-peak" is generally at least a factor of 3, too slow for normal photographic purposes. Accordingly, Nijland, et al., increased the combustion speed and hence lowered the "time-to-full-peak" by adding to the fill gas a volatile hydrocarbon compound. Recent studies with such additives, however, have shown that such additives react much too readily with fluorine or the volatile fluorine compounds to be satisfactory and in some cases are so reactive as to ignite spontaneously. Obviously, the use of such materials would not be satisfactory for commercial products.

It is, therefore, desirable to have an improved flash lamp of the fluorine oxidant type wherein the "time-to-full-peak" is within acceptable limits for normal photographic purposes.

OBJECTS OF THE INVENTION

It is, therefore, an object of the present invention to provide an improved flash lamp.

It is a further object of the present invention to provide an improved flash lamp having a sufficiently fast "time-to-full-peak" suitable for general photographic applications.

It is a further object of the present invention to provide an improved flash lamp of the fluorine oxidant type wherein the fill gas includes a "time-to-full-peak" accelerator which is stable with respect to the fill gas.

It is a still further object of the present invention to provide a flash lamp of the fluorine oxidant type which has a sufficiently short "time-to-full-peak" attained by the addition of a gaseous additive to the fluorine oxidant gas, the addition of the gaseous additive not adversely affecting, to a significant degree, the light output or the color distribution of the light generated by the flash lamp during use.

These and still further objects, features and advantages of the present invention will become apparent upon consideration of the following detailed disclosure.

BRIEF SUMMARY OF THE INVENTION

These and still further objects of the present invention are achieved, in accordance therewith, by providing a flash lamp having a sealed transparent bulb containing a solid metallic substance, an oxidant gas, and an ignition mechanism therein or associated therewith. The oxidant gas comprises fluorine or a volatile or gaseous fluorine compound which will dissociate into fluorine upon ignition of the solid metallic substance, and a minor amount of a "time-to-full-peak" combustion accelerator comprising a totally halogenated inorganic or organic compound having at least one chlorine atom in its molecular structure. It has been found that by use of such an accelerator the "time-to-full-peak" can be reduced from the greater than 45 millisecond range to the less than 20 millisecond range, as is needed for general photographic purposes. This decrease in "time-to-full-peak" is achieved without loss in light output or significant degradation in the spectral distribution which might make such a flash lamp unsuitable for general photographic applications. Examples of accelerators of the inorganic class are the totally halogenated compounds of the group IV elements, such as silicon tetrachloride, titanium tetrachloride, germanium tetrachloride, tin tetrachloride, etc. Examples of accelerators of the organic class are the totally halogenated hydrocarbons, such as tetrachloromethane (i.e., carbon tetrachloride); monofluoro-trichloromethane; difluoro-dichloro-methane; 1,1,1-trifluoro-trichloro-ethane; 1,1,2-trifluorotrichloro-ethane; etc.

Use of gaseous bromo and/or iodo halogenated or mixed halogenated compounds are presently contemplated to the extent that such compounds are sufficiently stable throughout the anticipated storage life of the flash lamp. For example, such compounds to be satisfactory for use in this invention should not spontaneously ignite when they are mixed with the fluorine oxidant upon addition to the bulb during flash lamp manufacture. Additionally, such materials should not react with the fluorine oxidant during storage whereby upon ignition the desired effect of decreased "time-to-full-peak" will not be achieved.

It is also contemplated that mixtures of accelerating additives may be found suitable for use in the practice of the present invention.

The accelerator is preferably in the gaseous state so it can be readily introduced into the bulb during flash lamp manufacture and, at ignition of the solid metal, will be uniformly dispersed throughout the oxidant gas and thus ready for appropriate reaction to give the desired effect.

Liquid accelerators of the broad class herein described can be used if they have vapor pressures at ambient conditions to place sufficient amounts of the accelerator in the gaseous state to achieve the desired decrease in "time-to-full-peak" upon ignition. Titanium tetrachloride, tin tetrachloride, and some of the other aforementioned materials are examples of liquids which afford the desired results. However, since the vapor pressures of titanium tetrachloride and tin tetrachloride are only marginal at ambient conditions, the decrease in "time-to-full-peak" attained is not as great as attained with other additives described herein.

The accelerator is added in minor amounts to the oxidant gas during filling of the flash lamp. In the data which follows, the accelerator concentration is generally given in per cent of total gas pressure. With the accelerators tested so far, the "total light output" (defined as the integral of the luminous flux over the duration of the flash) reaches a maximum at a certain percentage of accelerator added and then decreases with the addition of additional accelerator. Such further additions of accelerator while not serving to increase total light output do have the effect, however, of further decreasing the "time-to-full-peak" and, simultaneously, increasing the light intensity at full peak. The decrease in "time-to-full-peak" is dependent upon the amount of additive added to the oxidant gas. Accordingly, by appropriate selection of a particular accelerator and the quantity thereof which will be added to the flash lamp, the light output from the flash lamp can be tailored for a particular photographic application. In general, however, about 3 – 4 percent accelerator is sufficient to lower the "time-to-full-peak" to the 10 – 20 millisecond range, with further amounts of accelerator additionally decreasing the "time-to-full-peak" but by a proportionately less amount. Accordingly, it is presently contemplated that, for most photographic applications, not more than 10 percent accelerator, calculated as a percentage of the total pressure in the bulb, will be required to decrease the "time-to-full-peak" to the desired range.

The solid substance to be burned upon ignition in the flash lamp may be selected, as is well known in this field, from the elements of the third group of the Periodic Table, the rare earth metals, the actinides, and the fourth subgroup of the Periodic Table, including, for example, boron, aluminium, scandium, ytterbium, lanthanum, cerium, and other rare earths, actinium, thorium, titanium, zirconium, and hafnium. Those elements of moderate price which can readily be formed into wires, foils, or shreds are particularly useful. This applies, for example, to aluminium, zirconium, hafnium and magnesium.

Besides elemental fluorine as the oxidant gas, use can be made of those gaseous fluorine compounds which are stable at room temperature (or at those temperatures expected to be experienced during storage of the flash lamp) and which readily dissociate under flash lamp ignition conditions to yield fluorine. Exemplary materials as are well known in this are include oxygen fluoride ($OF_2$), nitrogen fluorides ($NF_3$, $N_2F_2$, $N_2F_4$), nitrosyl fluoride (NOF), nitryl fluoride ($NO_2F$), chlorine fluorides ($ClF_3$, ClF), iodine fluorides ($IF_5$, $IF_7$), etc., or mixtures thereof.

DESCRIPTION OF THE SPECIFIC EMBODIMENTS

The following Examples are given to enable those skilled in the art to more clearly understand and practice the present invention. They should not be considered as a limitation upon the scope of the invention but merely as being illustrative thereof.

In the following Examples, a flash lamp having a glass bulb 2 inches long, 5/8 inch diameter, and a capacity of approximately 8 $cm^3$ is filled with one-half millimole of shredded metal and clamped down on a gasket to provide an air-tight seal. After the air therein is withdrawn, the combustion accelerator is admitted. The fluorine or fluorine-compound oxidant gas is then admitted to the bulb, the flash lamp ignited and the physical characteristics of the generated light measured by conventional techniques.

The shredded metal is in the form of 4 inches strands, 0.93 or 0.97 mil thick and 1.8 mil wide.

When such a lamp is filled with one-half millimole of zirconium and fluorine to a total pressure 3 atmospheres absolute, the total quantity of light produced, after ignition, is about 3,600 lumenseconds; the "time-to-full-peak" is about 45 msec.; and the color temperature is about 5,520°K. As a measure of comparison, when the stoichiometrically equivalent quantity of oxygen (1.5 atmospheres) is used in place of the 3 atmospheres of fluorine, the total quantity of light produced is about 3,200 lumenseconds; the "time-to-full-peak" is about 13 msec.; and the color temperature is about 4,410°K.

When such a lamp is filled with one-half millimole of hafnium and fluorine to a total pressure of 3 atmospheres absolute, the total quantity of light produced, after ignition, is about 5,100 lumenseconds; the "time-to-full-peak" is about 70 msec.; and the color temperature is about 5,710°K. Also as a measure of comparison, when 1.5 atmospheres oxygen are used in place of the 3 atmospheres of fluorine, the total quantity of light produced is about 4,600 lumenseconds; the "time-to-full-peak" is about 20 msec.; and the color temperature is about 4,520°K.

EXAMPLES I – IV

Figure 1:
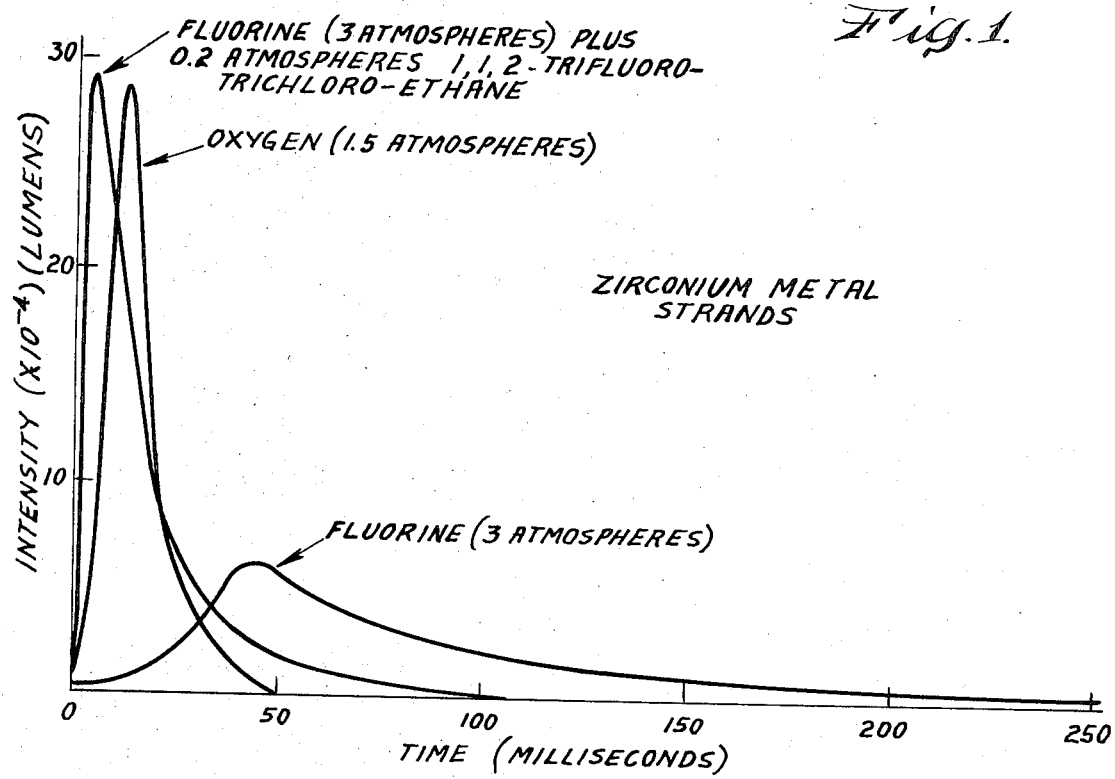
FIG. 1 is a graph of light output as a function of time for a lamp containing zirconium metal strands and burning in an atmosphere of either oxygen or fluorine with trifluorotrichloro-ethane.

In addition to the ½ millimole of zirconium and the 3 atmospheres of fluorine, varying amounts of 1,1,2-trifluorotrichloro-ethane are added to the sealed bulb. The results obtained are indicated in Table I. The decrease in the "time-to-full-peak" of Example IV, where about 6 percent of the combustion accelerator is added to the fluorine gas, is compared to the results obtained with either oxygen or fluorine, without accelerator, in FIG. 1.

The values given above for Examples I – IV and the zirconium and hafnium controls are the averages of a number of test runs.

Table I

| Quantity - Accelerator (atm.) | "Time-to-full-peak" (msec.) | Total light output (lumenseconds) | Color Temperature (°K) |
|---|---|---|---|
| 0.05 | 28 | 4700 | 5450 |
| 0.1 | 18 | 5200 | 5700 |
| 0.15 | 8 | 4900 | 5600 |
| 0.2 | 4 | 4700 | 5500 |

EXAMPLE V 0.2 atmosphere of 1,1,1-trifluoro-trichloro-ethane is added to the bulb in place of the combustion accelerator of Examples I – IV. The "time-to-full-peak" is about 4 msec., the total light output is about 4,200 lumenseconds, and the color temperature is about 5,470°K.

EXAMPLE VI 0.2 atmosphere of monofluoro-trichloro-methane is added to the bulb in place of the combustion accelerator of Examples I – IV. The "time-to-full-peak" is about 8 msec., the total light output is about 4,700 lumenseconds, and the color temperature is about 5,540°K.

EXAMPLE VII 0.2 atmosphere of silicon tetrachloride is added to the bulb in place of the combustion accelerator of Examples I–IV. The "time-to-full-peak" is about 10 msec., the total light output is about 4,900 lumenseconds, and the color temperature is about 5,320°K.

EXAMPLE VIII 0.1 atmosphere of carbon tetrachloride is added to the bulb in place of the accelerator of Examples I–IV. The "time-to-full-peak" is about 22 msec., the total light output is about 4,900 lumenseconds, and the color temperature is about 5,690°K.

EXAMPLE IX 1.5 atmospheres of $N_2F_4$ and 0.2 atmosphere of 1,1,-2-trifluoro-trichloro-ethane are added to the bulb in place of the fluorine gas and the combustion accelerator of Examples I–IV. The "time-to-full-peak" is about 8 msec., the total light output after ignition is about 4,200 lumenseconds and the color temperature is about 5,180°K. Without the combustion accelerator, the "time-to-full-peak" is about 35–40 msec.

EXAMPLE X 0.1 atmosphere germanium tetrachloride is added to the bulb in place of the combustion accelerator of Examples I–IV. The "time-to-full-peak" is about 25 msec.

EXAMPLES XI – XII 0.05 atmosphere tin tetrachloride and 0.05 atmosphere titanium tetrachloride, respectively, are added to the bulb in place of the combustion accelerator of Examples I–IV. In each case the "time-to-full-peak" is reduced by about 10 percent over that obtained without accelerating additive.

EXAMPLES XIII–XVI

Figure 2:
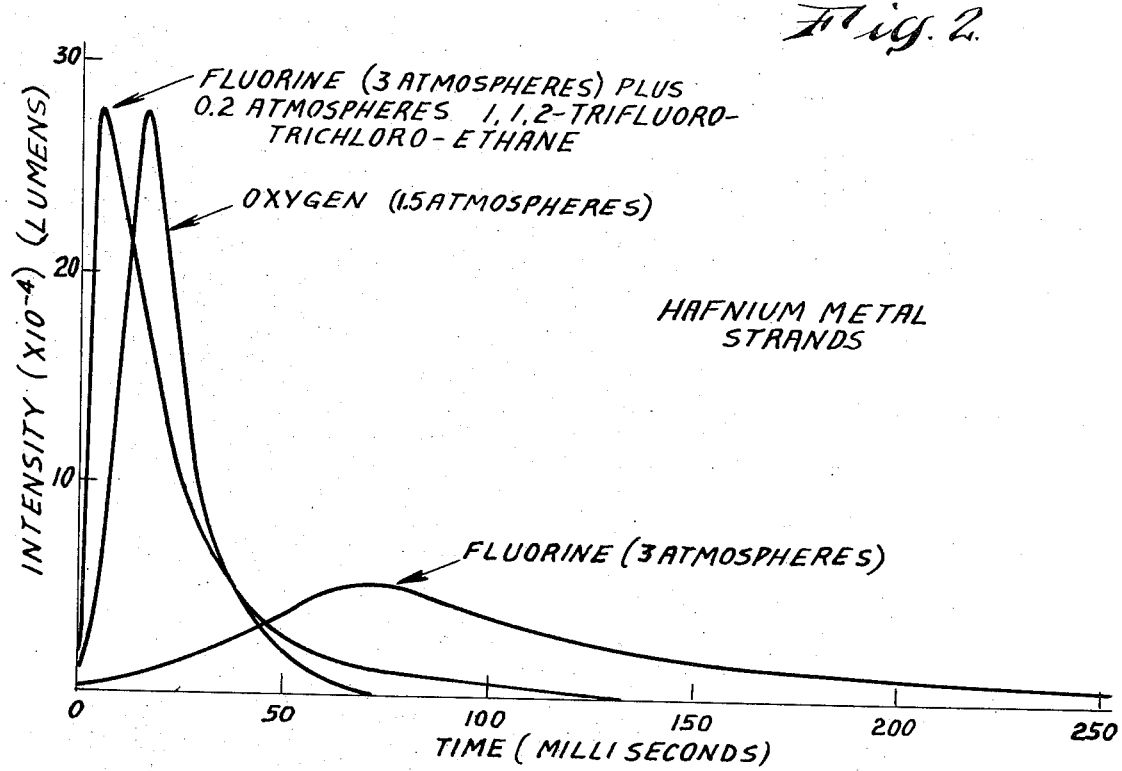
FIG. 2 is a graph of light output as a function of time for a lamp containing hafnium metal strands and burning in an atmosphere of either oxygen or fluorine with trifluorotrichloro-ethane.

To the bulb, as described above, there is added one-half millimole of hafnium and 3 atmospheres absolute of fluorine gas. Various quantities of 1,1,2-trifluoro-trichloro-ethane are also added to the bulb. The results obtained therewith are indicated in Table II. The decrease in the "time-to-full-peak" of Example XVI, where about 6 percent of the combustion accelerator is added to the fluorine gas, is compared to the results obtained with either oxygen or fluorine, without accelerator, in FIG. 2.

Table II

| Quantity - Accelerator (atm.) | "Time-to-full-peak" (msec.) | Total light output (lumenseconds) | Color Temperature (°K) |
|---|---|---|---|
| 0.05 | 44 | 6300 | 5630 |
| 0.1 | 30 | 7400 | 5590 |
| 0.15 | 12 | 7200 | 5780 |
| 0.2 | 6 | 6300 | 5650 |

EXAMPLE XVII 0.2 atmosphere of 1,1,1-trifluoro-trichloro-ethane is added to the bulb in place of the combustion accelerator of Examples XIII–XVI. The "time-to-full-peak" is about 7 msec., the total light output is about 6,800 lumenseconds, and the color temperature is about 5,430°K.

EXAMPLE XVIII 0.1 atmosphere of difluoro-dichloro-methane is added to the bulb in place of the combustion accelerator of Examples XIII–XVI. The "time-to-full-peak" is about 36 msec., the total light output is about 5,400 lumenseconds, and the color temperature is about 5,600°K.

EXAMPLE XIX 0.2 atmosphere of monofluoro-trichloro-methane is added to the bulb in place of the combustion accelerator of Examples XIII–XVI. The "time-to-full-peak" is about 12 msec., the total light output is about 7,300 lumenseconds, and the color temperature is about 5,430°K.

EXAMPLE XX 0.1 atmosphere of carbon tetrachloride is added to the bulb in place of the combustion accelerator of Examples XIII–XVI. The "time-to-full-peak" is about 28 msec., the total light output is about 7,000 lumenseconds, and the color temperature is about 5,720°K.

EXAMPLE XXI 0.2 atmosphere of silicon tetrachloride is added to the bulb in place of the combustion accelerator of Examples XIII–XVI. The "time-to-full-peak" is about 12 msec., the total light output is about 6,300 lumenseconds, and the color temperature is about 5,300°K.

EXAMPLE XXII 0.1 atmosphere of germanium tetrachloride is added to the bulb in place of the combustion accelerator of Examples XIII–XVI. The "time-to-full-peak" is about 35 msec.

EXAMPLE XXIII 2 atmospheres of $NF_3$ and 0.2 atmosphere of 1,1,2-trifluoro-trichloro-ethane are added to the bulb in place of the fluorine gas and the combustion accelerator of Examples XIII–XVI. The "time-to-full-peak" is about 45 msec., the total light output is about 1,700 lumenseconds, and the color temperature is about 4,900°K.

EXAMPLE XXIV 1.5 atmospheres of $NF_3$ and 0.75 atmosphere of fluorine gas were added to the bulb in place of the fluorine gas of Examples XIII–XVI; and 0.2 atmosphere of 1,1,-2-trifluoro-trichloro-ethane is added to the gas in place of the combustion accelerator of Examples XIII–XVI. The "time-to-full-peak" is about 14 msec., the total light output is about 3,500 lumenseconds, and the color temperature is about 5,100°K.

EXAMPLE XXV 1.5 atmospheres of $N_2F_4$ and 0.2 atmosphere of 1,1,-2-trifluoro-trichloro-ethane are added to the bulb in place of the fluorine gas and the combustion accelerator of Examples XIII–XVI. The "time-to-full-peak" is about 10 msec., the total light output is about 4,000 lumenseconds, and the color temperature is about 5,300°K. Without the combustion accelerator, the "time-to-full-peak" is about 65–70 msec.

Unless otherwise indicated, the data given in these Examples are individual run test data, and not averages of a number of test runs. However, the individual run test data is considered representative of the results which can be obtained if the combustion accelerations herein described are utilized in accordance with the teachings of this invention.

The use of the additives herein described is applicable to both low pressure (less than 3 atmospheres total pressure) flash lamps and high pressure (greater than 3 atmospheres total pressure) flash lamps. The basic requirement is that at the particular total pressure utilized there be sufficient vapor pressure (or concentration) of the accelerating additive to achieve the desired result. Since, in a high pressure system, a greater absolute quantity of the accelerating additive will be required (at the same percentage condition compared to a lower pressure system), it is incumbent to select an accelerating additive which will reasonably afford the desired, and necessary, vapor pressure. Since some of the totally halogenated hydrocarbons described above are gaseous at the pressures contemplated in high pressure flash lamps (i.e., 10–20 atmospheres total pressure) they afford sufficient vapor pressure in such a lamp to achieve the desired decrease in "time-to-full-peak."

EXAMPLE XXVI

To a transparent bulb having a capacity of approximately 1.5 cm³, there is added ½-millimole zirconium, 15 atmospheres fluorine and 1 atmosphere dichloro-difluoro-methane. The "time-to-full-peak" is about 3 msec. Without the combustion accelerator, the "time-to-full-peak" is about 25 msec.

EXAMPLE XXVII

One-half millimole of hafnium is added to the bulb of Example XXVI in place of zirconium. The "time-to-full-peak" is about 5 msec. Without the combustion accelerator, the "time-to-full-peak" is about 40 msec.

The present invention is considered distinct and different from the teachings of deVriend, et al., U.S. Pat. No. 2,554,094, wherein it is taught that carbon tetrachloride, silicon tetrachloride, titanium tetrachloride, germanium tetrachloride, tin tetrachloride, etc., are useful as combustion retarders in a flash-lamp having a gaseous filling of oxygen. Although the aforementioned deVriend, et al., additives have been shown to be useful in the present invention, their use in the deVriend system is with a different material (oxygen as opposed to fluorine or gaseous fluorine compounds as used in the present invention) and, more importantly, is for a different purpose attended by a diametrically opposite result from that obtained with the present invention. That is, in the deVriend flashlamp the additives retard combustion to thereby yield a longer "50 percent flash time" whereas in the present invention the additive has the effect of significantly decreasing the "time-to-full-peak", i.e., the additive accelerates combustion. Such an effect, as is now taught by the present invention, is not believed to be apparent from the teachings of deVriend, et al.

While the present invention has been described with reference to specific embodiments thereof, it will be understood by those skilled in the art, that various changes may be made and equivalents may be substituted for portions thereof without departing from the true spirit and scope of the invention. In addition, many modifications may be made to adapt a particular situation, material, apparatus or process, to the spirit of the present invention without departing from its essential teachings.

What is claimed is:

1. A flash lamp comprising a sealed transparent bulb having an ignition mechanism associated therewith, said bulb having a solid substance and a gaseous atmosphere therein, said flash lamp providing electromagnetic radiation upon ignition due to a chemical reaction between said solid substance and said gaseous atmosphere; said gaseous atmosphere comprising a major amount of fluorine and/or at least one gaseous fluorine compound which readily dissociates under ignition conditions and reacts with said solid substance upon ignition, and a minor amount of a fluid combustion accelerator selected from the group consisting of totally halogenated inorganic and organic compounds having at least one chlorine atom in its molecular structure, said gaseous atmosphere being at least substantially free of oxygen.

2. The flash lamp of claim 1 wherein said solid substance is selected from the group consisting of zirconium, hafnium, aluminum, magnesium and the rare earth metals.

3. The flash lamp of claim 1 wherein said major amount of said gaseous atmosphere comprises fluorine.

4. The flash lamp of claim 1 wherein said major amount of said gaseous atmosphere comprises a gaseous fluorine compound of a non-metal.

5. The flash lamp of claim 1 wherein said combustion accelerator is a gaseous material.

6. The flash lamp of claim 1 wherein said combustion accelerator is a low-boiling liquid in sufficient quantities to have, at ambient conditions, sufficient vapor pressure to accelerate the combustion of said solid substance with said major amount of said gaseous atmosphere, whereby the time from ignition to the time of peak light intensity will be decreased to a photographically usable range.

7. The flash lamp of claim 1 wherein said combustion accelerator comprises a totally halogenated inorganic compound.

8. The flash lamp of claim 1 wherein said combustion accelerator comprises a totally halogenated inorganic compound of a group IV element.

9. The flash lamp of claim 1 wherein said combustion accelerator comprises a tetrachloride of a group IV element.

10. The flash lamp of claim 1 wherein said combustion accelerator comprises silicon tetrachloride.

11. The flash lamp of claim 1 wherein said combustion accelerator comprises germanium tetrachloride.

12. The flash lamp of claim 1 wherein said combustion accelerator comprises tin tetrachloride.

13. The flash lamp of claim 1 wherein said combustion accelerator comprises titanium tetrachloride.

14. The flash lamp of claim 1 wherein said combustion accelerator comprises a totally halogenated organic compound.

15. The flash lamp of claim 1 wherein said combustion accelerator comprises a totally halogenated hydrocarbon.

16. The flash lamp of claim 1 wherein said combustion accelerator comprises carbon tetrachloride.

17. The flash lamp of claim 1 wherein said combustion accelerator comprises monofluoro-trichloro-methane.

18. The flash lamp of claim 1 wherein said combustion accelerator comprises difluoro-dichloro-methane.

19. The flash lamp of claim 1 wherein said combustion accelerator comprises 1,1,1-trifluoro-trichloro-ethane.

20. The flash lamp of claim 1 wherein said combustion accelerator comprises 1,1,2-trifluoro-trichloro-ethane.

21. The flash lamp of claim 1 wherein said combustion accelerator is present in a quantity sufficient to decrease the time from ignition to the time of peak light intensity to a range of less than about 20 milliseconds.

22. The flash lamp of claim 1 wherein said combustion accelerator is present in a quantity sufficient to decrease the time from ignition to the time of peak light intensity to the range of about 10 to about 20 milliseconds.

23. The flash lamp of claim 1 wherein said combustion accelerator is present in a quantity up to about 10 percent of the total gas pressure within said bulb.

24. A flash lamp comprising a sealed transparent bulb having an ignition mechanism associated therewith, said bulb having a solid substance and a gaseous atmosphere therein, said flash lamp providing electromagnetic radiation upon ignition due to a chemical reaction between said solid substance and said gaseous atmosphere; said gaseous atmosphere comprising a major amount of fluorine and/or at least one gaseous fluorine compound which readily dissociates under ignition conditions and reacts with said solid substance upon ignition, and a minor amount of a fluid combustion accelerator selected from the group consisting of totally halogenated inorganic and organic compounds having at least one non-fluorine halogen atom in its molecular structure, said gaseous atmosphere being at least substantially free of oxygen.

25. The flash lamp of claim 24 wherein said combustion accelerator is present in a quantity up to about 10 percent of the total gas pressure within said bulb.

* * * * *